Patented July 11, 1950

2,515,145

UNITED STATES PATENT OFFICE 2,515,145

PROCESS FOR THE INCORPORATION OF HYDROPHILIC MATERIAL INTO ORGANIC MEDIA

Willem Johannes Dominicus van Dijck, The Hague, Netherlands, assignor to Shell Development Company, San Francisco, Calif., a corporation of Delaware No Drawing. Application October 9, 1947, Serial No. 778,760. In the Netherlands October 2, 1946

10 Claims. (Cl. 106—262)

This invention relates to a process for the incorporation of hydrophilic material into organic media. More particularly the invention relates to a process for the transformation of hydrophilic pigments from an aqueous medium in which they are contained into an organic medium, such as a paint or lacquer base, in which they are desired to be employed.

More specifically the invention provides a very efficient and highly economical process for the incorporation of hydrophilic pigments contained in an aqueous medium into an organic medium without carrying any destructive quantity of water with the said pigment particles or destroying the fine colloidal structure of the said pigment, which process broadly comprises treating the aqueous medium containing the desired pigments with an auxiliary liquid that is miscible with both the aqueous and organic medium in which the pigment is to be incorporated, subjecting the resulting mixture to distillation and adding a specific quantity of the said organic medium to the mixture before or during the distillation, continuing the distillation until substantially all of the water and the desired amount of auxiliary liquid has been removed and then recovering the distillation residue as the desired pigment-containing organic medium, precautions being taken to maintain the distillation mixture as a one-phase liquid either during the entire distillation or at least during the later stages of the distillation, in the latter case preventing the liquid phase containing the pigment from becoming so small as to cause clotting of the pigment.

Surface coatings such as paints and lacquer are, in general, made up of two major components, (1) a liquid vehicle which gives the coating the necessary base, and (2) pigments, such as chrome yellow, chrome green and the iron ferrocyanide pigments, which gives the coating the desired color. In almost all cases the liquid vehicle employed in the production of the surface coatings are hydrophobic, oily media which do not readily tolerate water except in very minute quantities. Any water that is present during the preparation of surface coatings from these hydrophobic liquid vehicles is not taken into the coating composition but is retained only in an emulsified form and in that form readily destroys the desired properties of the surface coating. To produce superior coatings it is quite necessary, therefore, to introduce components into the liquid vehicles which are relatively free of water. This is particularly difficult, however, in the case of most pigments which are produced by chemical reactions as fine colloidal particles in aqueous media. The pigments so produced are generally hydrophilic and hold on tenaciously to the water particles. Many methods have been employed in the past to dehydrate these pigments so that they may be readily employed in the production of superior surface coatings but such methods have met with so many difficulties as to make their use highly unfeasible.

One method employed in the past for the preparation of the waterfree pigments is to remove as much water as possible from the pigments by ordinary filtration or decantation and then dry the pigments in an oven or furnace. The dried pigments are then ground, mixed with oil and ground again. In spite of all the trouble and expense involved in these numerous operations, however, the process has never been able to produce a pigment which has the same high degree of fineness as possessed by the pigments in the aqueous suspensions. The use of such coarse-grained pigments in the production of the surface coatings is highly undesirable as the resulting surface coatings are inferior in quality and covering capacity. In addition, even in those cases, which are rarely obtained, where the finished pigment particles are of the same order of fineness as the aqueous suspended particles the pigmentary value of the particles obtained have been so changed by the mechanical grinding process as to still produce inferior pigments.

Another method for the incorporation of the hydrophlic pigments into organic media such as the paint and lacquer bases comprises the addition of a solvent such as benzene to the aqueous medium containing the pigment and then subjecting the resulting mixture to evaporation or distillation. While this method removes most of the water from the pigment particles, it has the great disadvantage of leaving the particles of pigment in contact with the solvent, the presence of which is in many cases as undesirable as the presence of the water, due to the odor, chemical properties, etc. of the solvent which deleteriously affects the final surface coating. In addition this method has the disadvantage that as the evaporation or distillation continues into the latter stages and the amount of water remaining in the mixture is relatively small there is a tendency for the pigment to form large clots and hard agglomerates. As described hereinabove such a clotting readily interferes with the fine colloidal structure and final pigmentary value of the pigments and renders them inferior for use in the production of surface coatings.

It is an object of the invention, therefore, to provide an efficient and highly economical method for the transformation of hydrophilic pigments from aqueous to organic media without carrying over into the organic media any of the undesirable water or destroying the fine colloidal structure of the said material. It is a further object of the invention to provide a method for the incorporation of hydrophilic pigments, contained in an aqueous medium, into an organic medium, such as a paint or lacquer base, without destroying the fine pigmentary value of the said pigments. It is still a further object of the invention to provide a method for the incorporation of hydrophilic pigments into paint or lacquer bases which avoids the necessity of using any costly mechanical pulverization method. It is a further object of the invention to provide a method for the incorporation of hydrophilic pigments into paint or lacquer bases which produces pigmented paint or lacquer bases of exceptionally fine quality which, when incorporated into surface coatings, do not deleteriously affect the said coating with an undesirable odor, inferior texture, etc. It is still a further object to provide a method for the production from hydrophilic pigments of surface coatings of excellent quality possessing a first-rate covering capacity, excellent texture and color and superior resistance to the elements. Other objects of the invention will be apparent from the detailed description given hereinafter.

It has now been discovered that these and other objects may be accomplished by the novel process of the invention which comprises treating the aqueous medium containing the desired pigments with an auxiliary liquid that is miscible—at least to a certain extent—both with the aqueous medium and the organic medium in which the pigment is to be finally contained, subjecting the resulting mixture to distillation and adding a specific quantity of the said organic medium to the mixture before or during the distillation, continuing the distillation until substantially all of the water and desired amount of auxiliary liquid has been removed and then recovering the distillation residue as the desired pigment-containing organic medium, precaution being taken to maintain the distillation mixture as a one-phase liquid, either during the entire distillation or at least during the later stages of the distillation, in the latter case preventing the liquid phase containing the pigment from becoming so small as to cause clotting of the pigment. This process readily enables the transformation of hydrophilic pigments into the desired organic medium without transferring with the said pigment any of the undesirable water and without destroying any of the colloidal structure or pigmentary value of the said pigment particles for at no time during the distillation is the pigment allowed to clot or form into hard agglomerates. In addition the pigment containing organic medium produced by the above-described process is substantially freed of solvents and may be readily utilized to produce surface coatings of exceptionally fine quality in covering capacity, texture and color.

Substantially any hydrophilic pigment or dyestuff may be incorporated into the desired organic medium by means of the above described process of the invention. Examples of some of the more common pigments that may be employed are the iron blues, such as Prussian blue, Chinese blue, Bronze blue, Steel blue, Milori blue, etc., lead chromate, chrome yellow, chrome green and the like and mixtures thereof.

The organic media into which the above described pigments may be incorporated by the process of the invention may be substantially any organic medium in which the said pigments are desired to be utilized. In most cases such organic media will comprise the paints and lacquer bases such as linseed oil, stand-oil, Chinese wood-oil, oiticica-oil, perilla-oil, dehydrated castor-oil, soya bean oil, various fish-oils, cellulose esters and ethers, vinyl and acryl resins, chlorinated rubber, urea resins, phthalate resins, particularly phthalate resins modified with fatty acids, phenol resins, alkyl phenol resins, and the like and mixtures thereof.

The auxiliary liquid used in the process of the invention may best be defined by setting forth the qualifications which the said liquid should possess. The auxiliary liquid should be both miscible with the water phase containing the pigment and with the organic medium which is to be subsequently introduced into the process. The degree of miscibility which the auxiliary liquid has with the aqueous and organic media should be sufficiently high as to avoid the necessity of using large amounts of the said liquid to reach the desired homogeneity in the distillation mixture as described hereinafter. If the auxiliary liquid selected does not form an azeotropic mixture with the water it will be advisable to utilize an auxiliary liquid having a boiling point higher than that of water. If, however, the auxiliary liquid does form an azeotropic mixture with the water phase then it will be relatively easy to utilize an auxiliary liquid having a boiling point below that of water. An auxiliary liquid which does not possess a boiling point higher than water and does not form an azeotropic mixture with the water may be utilized in some cases but it necessitates the addition of large, cumbersome quantities of auxiliary liquid to the distillation mixture in order to ensure the removal of substantially all of the water particles. It is quite evident that the boiling point of the auxiliary liquid should be lower than that of the organic medium which is to be introduced into the distillation mixture. In addition, the auxiliary liquid should be sufficiently volatile at a temperature below that at which the pigment in the solution begins to be deleteriously affected in order to avoid the pressure at which the distillation is to be carried out becoming undesirably low. While it is not essential it is highly desirable for economical reasons to select an auxiliary liquid which is only slightly miscible with water at a low temperature. In these cases the vapors obtained in the distillation, after being condensed and cooled, will produce two phases of which the one rich in the auxiliary liquid may be employed again in the process while the other phase may be drained or stripped of the auxiliary liquid by a subsequent fractional distillation.

Examples of auxiliary liquids that may be used in the process of the invention are the alcohols, such as isobutyl alcohol and the other butyl alcohols, amyl alcohols, ketones such as diethyl ketone, dihexyl ketone and the like, the ethers such as dioctyl ether and diphenyl ether, esters such as acetoacetic ester, ethyl isobutyrate, the phenols, amines, diacetone alcohol, Cellosolves, and the like as well as mixtures thereof.

As described hereinabove the first step in the process of the invention comprises treating an aqueous suspension of the pigment or dyestuff with a quantity of an auxiliary liquid. The pigment suspension employed in the preparation of the homogeneous mixture may be in the form of a slurry or solution such as might be obtained from the various processes which are employed to prepare the said pigments, or it may be in the form of a partially dehydrated paste. This latter form, i. e. the partially dehydrated paste, is the more preferred form to be employed in the process as it eliminates the necessity of handling large and cumbersome amounts of solution and enables the said process to be conducted in a more efficient and economical manner.

The partially dehydrated pigment paste may readily be prepared by subjecting an aqueous solution or slurry of the pigment to a filtration process and then partially dehydrating the resulting pigment pulp by evaporation at a relatively low temperature in order to remove some of the excess water. The evaporation should not be continued too far, however, as the pigment pulp should still remain quite wet in order to maintain the fine colloidal structure of the pigment particles. In some cases the dehydrating may be continued until the pigment pulp contains only about 50% by weight of water, while in other cases it may be necessary to stop the dehydration when the pigment pulp still contains about 90% by weight of water. Generally, however, it is possible to continue the dehydration until the water content of the pulp has been reduced to about 75% to about 85% by weight of water. Pigment pastes containing this range of water content, i. e. between about 75% to about 85%, are the more preferred to be employed in the process.

The amount of the auxiliary liquid to be initially added to the pigment suspension may vary over a considerably wide range depending upon the water content of the pigment suspension and the miscibility of the particular auxiliary liquid selected. The amount of the auxiliary liquid added should preferably be sufficient to at least form a homogeneous solution with the water of the pigment suspension at the distillation temperature. As the demixing zones are smaller at higher temperatures (as will be described later on) the mixing is preferably effected at higher temperatures, for instance, by adding the auxiliary solvent when hot. Excessive amounts over that required to produce a solution should, in most cases, be avoided as it only tends to lengthen the distillation period. In the incorporation of Prussian blue containing about 90% water into a linseed oil medium using isobutyl alcohol as the auxiliary liquid it has been found, for example, that a ratio of alcohol to water of about 3:1 has proved very satisfactory. An amount of auxiliary liquid in addition to that initially added to the pigment suspension may be added during the distillation as necessitated by the requirement to convert the distillation mixture into a one-phase liquid or to maintain the distillation mixture as a one phase liquid as explained hereinafter.

The next step of the process of the invention comprises subjecting the resulting, preferably homogeneous, mixture to a distillation process in order to remove the water and desired amount of auxiliary liquid as overhead distillate. The organic medium in which the pigment is desired to be incorporated is to be added to the distillation mixture before or during the course of this distillation process. As slightly more efficient results are obtained it is preferred to introduce the organic medium during the course of the distillation, particularly before any large quantity of the water has been removed overhead.

The amount of the organic medium to be added to the distillation mixture as well as the temperature and pressure to be employed during the distillation process will in the main depend upon the specific requirement of maintaining the distillation mixture as a one-phase liquid during the distillation and particularly during the later stages wherein the amount of water in the mixture is relatively low. To understand how such factors as the quantity of auxiliary liquid, water, and organic medium, as well as the temperature and pressure affect the number of liquid phases to be present in the mixture the following information concerning binary and ternary equilibria is presented.

Equilibrium systems may best be understood by use of the customary equilateral triangle as suggested by Willard Gibbs (1876) and G. G. Stokes (1891). If ABC in the following figure:

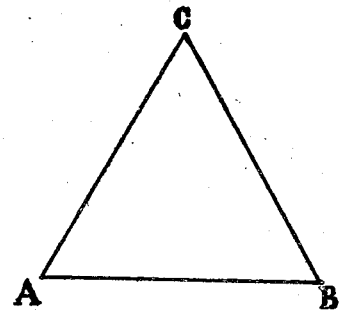

is an equilateral triangle, and P is any point within it, then the sum of the distances from P drawn parallel to the three sides is always the same, and is equal to the side of the triangle. By taking this side as unity, and expressing the amounts of the three components as fractions of the whole, it is possible to represent the composition of any ternary system by a point in the diagram. For example in the following figure:

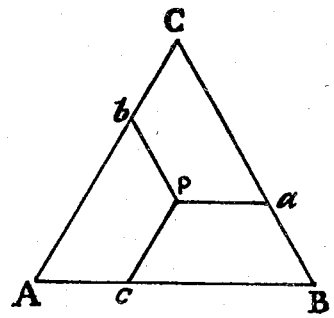

the corners of the triangle may be assumed to represent the pure components A (aqueous medium containing the pigments), B (organic medium), and C (auxiliary liquid); the distance from P to any side, measured parallel to either of the others, then gives the proportions of the component occupying the opposite corner; thus the distances Pa, Pb and Pc give the fractional amounts of the aqueous medium, organic medium and auxiliary liquid present in the system indicated by the point P. Any point within the triangle represents three components, but a point situated on one of the sides indicates two components only; the amount on the line BC would means the amount of A is zero, etc.

Consider now a three-component system such as is present in the homogeneous mixture to be distilled in the process of the invention, i. e. a mixture containing one auxiliary liquid which is miscible with the aqueous and organic media but the aqueous and organic media themselves are not miscible together. If a mixture of water and organic medium is prepared then at equilibrium there will be two conjugated layers whose compositions may be represented by the points $a$ and $b$ in the following figure:

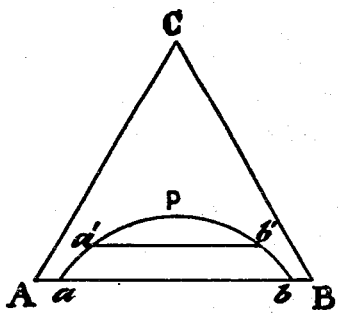

Now if some auxiliary liquid is added to the system it will distribute itself between the two layers as it is miscible with both layers and the mixture now becomes conjugated ternary solutions. The compositions of the two solutions are given points within the triangle, i. e. $a'$, $b'$. These points may be joined by a tie line, the extremes of which give the compositions of the two-phase equilibrium. Addition of further amounts of the auxiliary liquid causes the layers to dissolve more of this component and the mutual solubility of A and B increases and the compositions of the two layers approach each other as can be seen from diagram by the shortening of the tie lines. At the point P the two conjugated solutions have the same composition. The area under the arch $a, a', b', b$ is termed in the application a demixing area, i. e. when a composition lies within this area there will be a two-phase system rather than a one-phase system.

In the case of the three-liquid system of the water, organic medium, and auxiliary liquid there will always be a demixing area along the line water-organic medium. In most cases there will also be a demixing area along the line water-auxiliary liquid. And in some cases there may be a demixing area along the line organic medium-auxiliary liquid. As a general rule these demixing areas are smaller according as the temperature becomes higher. At lower temperatures two or three of the demixing areas may combine to form a single demixing area.

If the distillation mixture containing these three components, water, organic medium and auxiliary liquid is to be maintained as a one-phase liquid during the distillation process it will be necessary to avoid bringing the mixture into these demixing areas. As can be seen from the above discussion this may be achieved by controlling the proportions of water, auxiliary liquid and organic medium as well as the distillation temperature and pressure.

The course of the composition of the mixture during the distillation may be represented in the triangle below by a line:

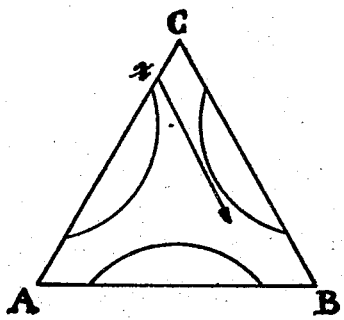

In the case that the initial material is a mixture of water and auxiliary liquid and the paint or lacquer base is added gradually during the distillation, this line starts from a point on the side of the triangle opposite the vertex B (organic medium) represented by X and then runs up to a point near the vertex B. In order to prevent this line from intersecting any demixing areas it is often sufficient to select the right initial point, in which case the distillation is generally carried out under atmospheric pressure or moderate vacuum. In special cases the line may be made to swerve by adding a quantity of one or two of the components or the demixing area may be reduced by raising the temperature or pressure. If the line approaches a demixing area, it is also possible, through the addition of a given quantity of organic medium at once, to alter the composition of the mixture momentarily in such a manner that a point on the other side of the demixing area is reached.

Allowance of the distillation mixture to lapse momentarily into a two-phase liquid usually is not fatal if the mixture is rapidly brought back to a one phase liquid and the distillation is not in the final stages, i. e. where the volume of the water in the mixture is approaching zero. The presence of a two phase liquid during the final stage of the distillation causes a clotting of the pigments which rapidly destroys their pigmentary value. Maintenance of the distillation mixture as a one-phase liquid particularly during the final stages of distillation is, therefore, essential to a successful completion of the process of the invention.

In most cases it is sufficient and convenient to adjust the amount and rate of addition of the organic medium to the distillation mixture in such a way as to maintain the volume of the distillation mixture approximately constant. For example, if the original volume of the distillation mixture were about 200 cc. the addition of the organic medium at a rate sufficient to maintain the volume at about 190 cc. to about 200 cc., in most cases, should be sufficient to maintain the distillation mixture as a one-phase liquid. The addition of higher or lower amounts of organic medium than the above-described may be required or desired and the exact amount to be added may best be determined for each individual case in accordance with the above described instructions concerning the ternary equilibria. In several cases it will be desirable first to mix the pigment suspension in water with the auxiliary liquid only, and to distil this mixture until a sufficient concentration of pigment in the residue has been obtained, after which the organic medium is added at such a rate as to keep the volume of the mixture approximately constant.

The temperature employed during the distillation process to accomplish the removal of the water and the auxiliary liquid and maintain the distillation mixture as a one-phase liquid will generally lie between about 50° C. to about 200° C. with a range of between about 65° C. to about 150° C. being the more preferred. Higher or lower temperatures than the above cited may be employed, however, if desired or necessary. Extremely high temperatures should be avoided where possible as in several cases such high temperatures deleteriously affect the sensitive structure of the pigment.

Atmospheric, subatmospheric or superatmospheric pressures may be employed as necessitated by the requirement of keeping the distillation liquid as a one phase liquid. Atmospheric pressure is usually all that will be required and that pressure is the more preferred.

The distillation apparatus employed for the process of the invention may be of any suitable construction as long as it provides a means for the application of heat, maintenance of the desired pressure, introduction of the various components and means for the removal and condensation of the water and auxiliary liquid vapors. Ordinary distillation stills connected to water condensers may be readily adapted for this intended use.

The distillation may be continued until substantially all of the water and auxiliary liquid has been removed or it may be stopped at any point after the quantity of water injurious to the organic medium and/or the surface coating produced therefrom has been removed. In most cases it is preferred to continue the distillation until the water and substantially all of the auxiliary liquid has been removed, but if the auxiliary liquid is of such a nature that it may be readily employed as a solvent or diluent in the paint or lacquer without any deleterious effect and the removal of the auxiliary liquid is not especially desired, it is sometimes advisable to allow part of the said liquid to remain in the distillation mixture by stopping the distillation any time after the water has been removed.

The process of the invention may be conducted in a batch-wise manner or may be readily adapted for use in a semi-continuous or continuous manner. In one continuous manner of operating the process, the auxiliary liquid recovered from the distillate may be recycled to the initial step of the process.

The product obtained from the process of the invention will be a pigmented-organic medium which will usually occur in the form of a paste or suspension. If the organic medium employed during the process has been the desired paint or lacquer base the said pigmented paste or suspension may be immediately applied to the preparation of the desired surface coating. In other cases it may be necessary to add the required base, solvents or diluents to the pigmented-organic medium before it may be utilized in the production of the desired surface coatings.

The surface coatings manufactured from the pigmented-organic mediums produced by the invention are characterized by their exceptionally fine qualities as to covering capacity, texture and color.

In addition to being utilized as a means for the incorporation of hydrophilic pigments into paints and lacquer bases the process of the invention may also be utilized to transfer the hydrophilic pigments from their aqueous mediums into other appropriate organic media such as printer's ink, Celluloid, artificial leather, explosives, cellulosic and like films, collodion, natural or synthetic resins and the like.

While the process of the invention has been more specifically directed to the transformation of hydrophilic pigments from their aqueous medium to the desired organic medium it may also be applied with equal success to the transformation of other hydrophilic material whose sensitive structure prevents other more drastic means from being utilized to transfer the said material into the desired organic medium. The process of the invention is of particular advantage, for example, in the preparation of valuable pharmaceutical preparations which are made up of sensitive hydrophilic colloidal material imbedded in protective oils and ointments. Also in the production of certain greases, the mechanical properties of which are obtained by imbedding a colloidal solid material in an oil, e. g. a mineral oil, the process according to the invention may be advantageous.

To illustrate how the process of the invention may be utilized to incorporate the hydrophilic material into the organic media the following examples are presented. The examples given are for the purpose of illustration only, however, and they should not be considered as limiting the invention in any way.

Example I

Prussian blue obtained in an aqueous medium from an iron salt and potassium ferrocyanide is rinsed by mixing it repeatedly with distilled water, decanting and subsequently filtering off the excess water, thus producing a filter cake containing about 90% water. This filter cake is then mixed with isobutyl alcohol in such a quantity that the ratio by weight of isobutyl alcohol to water in the mixture is about 3:1. This homogeneous mixture is then distilled under atmospheric pressure. During the distillation the original volume is maintained approximately by the addition of stand-oil. After substantially all of the water and isbutyl alcohol has been removed the distillation is discontinued. The final product obtained is a suspension of 1 part by weight of Prussian blue to 36 parts by weight of stand-oil. This suspension is then utilized in the manufacture of paints which when tested possess a first-rate covering capacity as well as a fine texture and excellent resistance to deteriorating elements.

Example II

Cakes of Prussian blue produced in Example I are mixed with isobutyl alcohol in such a quantity that the ratio by weight of isobutyl alcohol to water in the mixture is about 3:1. This mixture is distilled as in Example I except that no stand-oil is introduced during the first part of the distillation but is added only when twice as many parts by weight of water and alcohol than of Prussian blue remain in the mixture. During the further course of the distillation the number of parts by weight of stand-oil added is equal to that of the liquid distilled off. The product resulting is a paste containing about 1 part by weight of Prussian blue to 2 parts by weight of stand-oil. At no time during the distillation is there any clotting or formation of hard agglomerates of the pigment and the resulting product retains the pigment in the same fine, colloidal form in which it was as the pigment contained in the aqueous medium. The pigmented paste produced above is then diluted with stand-oil in accordance with the requirements and utilized to manufacture paints which when tested show an exceptionally fine quality in covering capacity and texture.

Example III

Cakes of Prussian blue produced in Example I are mixed with isobutyl alcohol in such a quantity that the ratio by weight of isobutyl alcohol to water in the mixture is about 4 to 1. This homogeneous mixture is then distilled as in Example I with the addition of the stand-oil during the distillation so as to maintain the original volume of the mixture. The distillation, however, is discontinued shortly after substantially all of the water has been removed. The mixture containing Prussian blue, isobutyl alcohol and stand-oil is then diluted to the required amount and utilized in the production of paint.

Example IV

Chrome yellow obtained in an aqueous medium is rinsed with distilled water and subsequently filtered to remove the excess water. The filter cake produced contains about 85% water. The cake is then mixed with amyl alcohol in such a quantity that the ratio of amyl alcohol to water in the mixture is about 4:1. This homogeneous mixture is then distilled under ordinary pressure. During the distillation the original volume is maintained by the addition of linseed oil. After substantially all of the water and amyl alcohol has been removed the distillation is discontinued. The final product obtained is a suspension of chrome yellow in linseed oil. During the distillation there is no clotting at any time of the pigment and the resulting suspension retains the chrome yellow in the same fine colloidal form in which it is retained in the aqueous suspension.

Example V

Chrome green obtained in an aqueous medium is rinsed and subsequently filtered to form filter cakes possessing about 70% by weight of water. These cakes are then mixed with dihexyl ketone in such a quantity that the ratio by weight of dihexyl ketone to water in the mixture is about 3:1. This homogeneous mixture is then distilled. During the distillation the original volume is maintained substantially at the same level by the addition of a partially polymerized mixture of diallyl phthalate and a plasticizer. The final product obtained is a suspension of chrome green in partially polymerized diallyl phthalate. The resulting mixture is then polymerized into a hard, green colored resin having exceptionally fine color, hardness and flexibility.

I claim as my invention:

1. A process for the incorporation of Prussian blue into stand oil, which comprises treating an aqueous suspension of the said Prussian blue with isobutyl alcohol in such a quantity that the ratio by weight of isobutyl alcohol to water in the pigment suspension is about 3:1, subjecting the resulting mixture to distillation to remove overhead the water and isobutyl alcohol, adding to the distillation mixture during the course of the distillation a sufficient quantity of stand-oil to maintain the said distillation mixture at substantially its original volume, continuing the distillation until substantially all of the water and substantially all of the isobutyl alcohol has been removed overhead and then recovering the desired Prussion blue stand oil mixture from the distillation residue, the proportions of isobutyl alcohol, stand oil and water in the distillation mixture being controlled so as to maintain a single liquid phase in that mixture throughout the distillation.

2. A process for the incorporation of chrome yellow into linseed oil, which comprises treating an aqueous suspension of the said chrome yellow with amyl alcohol in such a quantity that the ratio by weight of amyl alcohol to water in the pigment suspension is between about 3:1 to about 4:1, subjecting the resulting mixture to distillation to remove overhead the water and amyl alcohol, adding to the distillation mixture during the course of the distillation a sufficient quantity of linseed oil to maintain the said mixture at substantially its original volume, continuing the distillation until substantially all of the water and the desired amount of amyl alcohol has been removed overhead and then recovering the desired chrome yellow-linseed oil mixture from the distillation residue, the proportions of amyl alcohol, linseed oil and water in the distillation mixture being controlled so as to maintain a single liquid phase in the said distillation mixture throughout the distillation.

3. A process for the incorporation of Prussian blue into stand-oil, which comprises treating an aqueous suspension of the said Prussian blue with isobutyl alcohol in such a quantity and at such temperature as to form a homogeneous mixture therewith, subjecting the resulting mixture to distillation to remove overhead the water and isobutyl alcohol, adding stand-oil to the distillation mixture during the distillation, continuing the distillation until substantially all of the water and the desired amount of the isobutyl alcohol has been removed overhead and then recovering the distillation residue as the desired Prussian blue stand-oil mixture, the proportions of isobutyl alcohol, stand oil, and water in the distillation mixture being controlled so as to maintain a single liquid phase in that mixture at least during the latter stages of the distillation wherein the amount of water in the mixture is small.

4. A process for the incorporation of an iron ferrocyanide pigment into a drying oil, which comprises treating an aqueous suspension of the said pigment with isobutyl alcohol in such a quantity and at such temperature as to form a homogeneous mixture therewith, subjecting the resulting mixture to distillation to remove overhead the water and isobutyl alcohol, adding the said drying oil to the distillation mixture during the distillation, continuing the distillation until substantially all of the water and isobutyl alcohol has been removed overhead, and then recovering the distillation residue as the desired iron ferrocyanide-containing drying oil, the proportions of isobutyl alcohol, drying oil and water in the distillation mixture being controlled so as to maintain a single liquid phase in that mixture throughout the distillation.

5. A cyclic process for the incorporation of an iron ferrocyanide pigment into a hydrophobic, oily surface coating liquid vehicle, which comprises treating an aqueous suspension of the said iron ferrocyanide pigment with an auxiliary liquid that is miscible—at least in part—with the aqueous suspension and the liquid vehicle at high temperatures but is immiscible or considerably less miscible with the water at relatively low temperatures in such a quantity as to form a homogeneous mixture therewith, subjecting the resulting homogeneous mixture to distillation and adding the said liquid vehicle to the mixture during the distillation process, continuing the distillation until substantially all the water and the desired amount of auxiliary liquid has been removed, condensing and cooling the distillate, separating out the auxiliary liquid from the said distillate and recycling it back to the first step, and then recovering the distillation residue as the desired pigment-containing liquid vehicle, the proportions of said auxiliary liquid, surface coating vehicle and water in the distillation mixture being controlled so as to maintain a single liquid phase therein during the distillation particularly during the latter stages of distillation wherein the amount of water present is relatively small.

6. A process for the incorporation of pigments into a drying oil, which comprises treating an aqueous suspension of the said pigment with an auxiliary liquid that is miscible with both the aqueous medium and the drying oil in which the pigment is to be incorporated in such a quantity as to form a homogeneous mixture therewith, subjecting the resulting homogeneous mixture to distillation and adding the said drying oil to the mixture before the distillation, continuing the distillation until substantially all of the water and the desired amount of auxiliary liquid has been removed overhead and then recovering the distillation residue as the desired pigment-containing drying oil, the proportions of said auxiliary liquid, drying oil and water in the distillation mixture being controlled so as to maintain a single liquid phase in that mixture throughout the distillation.

7. A cyclic process for the incorporation of hydrophilic pigments into a hydrophobic, oily medium, which comprises treating the hydrophilic pigment with an auxiliary liquid that is miscible, at least to a certain extent, with the aqueous medium and the organic medium in which the pigment is to be incorporated at relatively high temperatures yet being immiscible or considerably less miscible with water at relatively low temperatures, subjecting the resulting mixture to distillation and adding the said organic medium to the mixture during the distillation, continuing the distillation until substantially all the water and the desired amount of auxiliary liquid has been removed overhead, condensing and cooling the distillate, separating out the auxiliary liquid from the said distillate and recycling it back to the first step, and then recovering the distillation residue as the desired pigment-containing organic medium, the proportions of said auxiliary liquid, organic medium and water in the distillation mixture being controlled so as to maintain a single liquid phase therein during at least the latter stages of distillation when the amount of water present is relatively small.

8. A cyclic process for the incorporation of solid, finely divided hydrophilic material available in the form of an aqueous suspension or aqueous paste into a hydrophobic, oily medium, which comprises treating the said hydrophilic material with an auxiliary liquid that is miscible both with the aqueous medium and the organic medium in which the hydrophilic material is desired to be incorporated, subjecting the resulting mixture to the distillation and adding the said organic medium to the mixture during the distillation, continuing the distillation until substantially all of the water and the desired amount of auxiliary liquid has been removed overhead, separating out of the condensed distillate the said auxiliary liquid and recycling it to the initial step, and then recovering the distillation residue as the desired hydrophilic material-containing organic medium, the proportions of said auxiliary liquid, organic medium and water in the distillation mixture being controlled so as to maintain a single liquid phase therein during at least the latter stages of distillation when the amount of water present is relatively small.

9. A process for the incorporation of solid, finely divided hydrophilic material available in the form of an aqueous suspension or aqueous paste into a hydrophobic, oily medium, which comprises treating the said hydrophilic material with an auxiliary liquid that is miscible both with the aqueous medium and the organic medium in which the hydrophilic material is desired to be incorporated, subjecting the resulting mixture to distillation and adding the said organic medium to the mixture during the distillation, continuing the distillation until substantially all of the water and the desired amount of auxiliary liquid has been removed, and then recovering the distillation residue as the desired hydrophilic material-containing organic medium, the proportions of said auxiliary liquid, organic medium and water in the mixture being controlled at least at a stage of the distillation wherein the amount of water in the mixture is relatively low so as to ensure the mixture being a one-phase liquid.

10. A process for the incorporation of solid, finely divided hydrophilic material available in the form of an aqueous suspension or aqueous paste into a drying oil, which comprises treating the said hydrophilic material with an auxiliary liquid that is miscible both with the aqueous medium and the drying oil in which the hydrophilic material is desired to be incorporated, subjecting the resulting mixture to distillation and adding the said drying oil to the mixture before the distillation, continuing the distillation until substantially all of the water and the desired amount of auxiliary liquid has been removed, and then recovering the distillation residue as the desired hydrophilic material containing organic medium, the proportions of said auxiliary liquid, drying oil and water in the mixture being controlled at least at a stage of the distillation wherein the volume of the liquid phase containing the pigment is relatively small, so as to ensure the mixture being a one-phase liquid.

WILLEM JOHANNES DOMINICUS van DIJCK.

REFERENCES CITED

The following references are of record in the file of this patent:

UNITED STATES PATENTS

| Number | Name | Date |
| --- | --- | --- |
| 2,357,028 | Shiras et al. | Aug. 29, 1944 |

FOREIGN PATENTS

| Number | Country | Date |
| --- | --- | --- |
| 318,937 | Great Britain | Jan. 9, 1929 |